US007475342B1

(12) United States Patent
Nevidomskiy

(10) Patent No.: US 7,475,342 B1
(45) Date of Patent: Jan. 6, 2009

(54) SYSTEMS, METHODS AND COMPUTER PROGRAM PRODUCTS FOR AUTOMATIC DISSEMINATION OF SPELLING RULES WITHIN WORKING GROUPS

(75) Inventor: Alexey Nevidomskiy, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/942,139

(22) Filed: Nov. 19, 2007

(51) Int. Cl.
*G06F 17/00* (2006.01)

(52) U.S. Cl. .................. 715/257; 715/257; 715/259; 455/413

(58) Field of Classification Search .......... 715/255–266
See application file for complete search history.

(56) References Cited

U.S. PATENT DOCUMENTS 5,970,492 A * 10/1999 Nielsen ................. 707/10
6,324,551 B1 11/2001 Lamping et al.
6,785,869 B1 8/2004 Berstis
2002/0143828 A1 10/2002 Montero et al.
2006/0026517 A1 * 2/2006 Weir ........................ 715/533

* cited by examiner

*Primary Examiner*—Doug Hutton
*Assistant Examiner*—Quoc A Tran
(74) *Attorney, Agent, or Firm*—Cantor Colburn LLP; Tracey Robertson

(57) ABSTRACT

Systems, methods, and computer program products for automatic dissemination of spelling rules within working groups. Exemplary embodiments include a method for automatic dissemination of spelling rules within working groups having a sender computer and a recipient computer, the method including composing a document on the sender computer, performing a spell check on text within the document, identifying a word flagged by the spell check as being absent from a dictionary associated with the spell check and with the sender computer, adding the flagged word to the dictionary associated with the sender computer, tagging the flagged word with an indication that the flagged word is to be added to a dictionary associated with the recipient computer in response to the document being received in the recipient computer, storing the indication within the document and sending the document to the recipient computer.

1 Claim, 2 Drawing Sheets

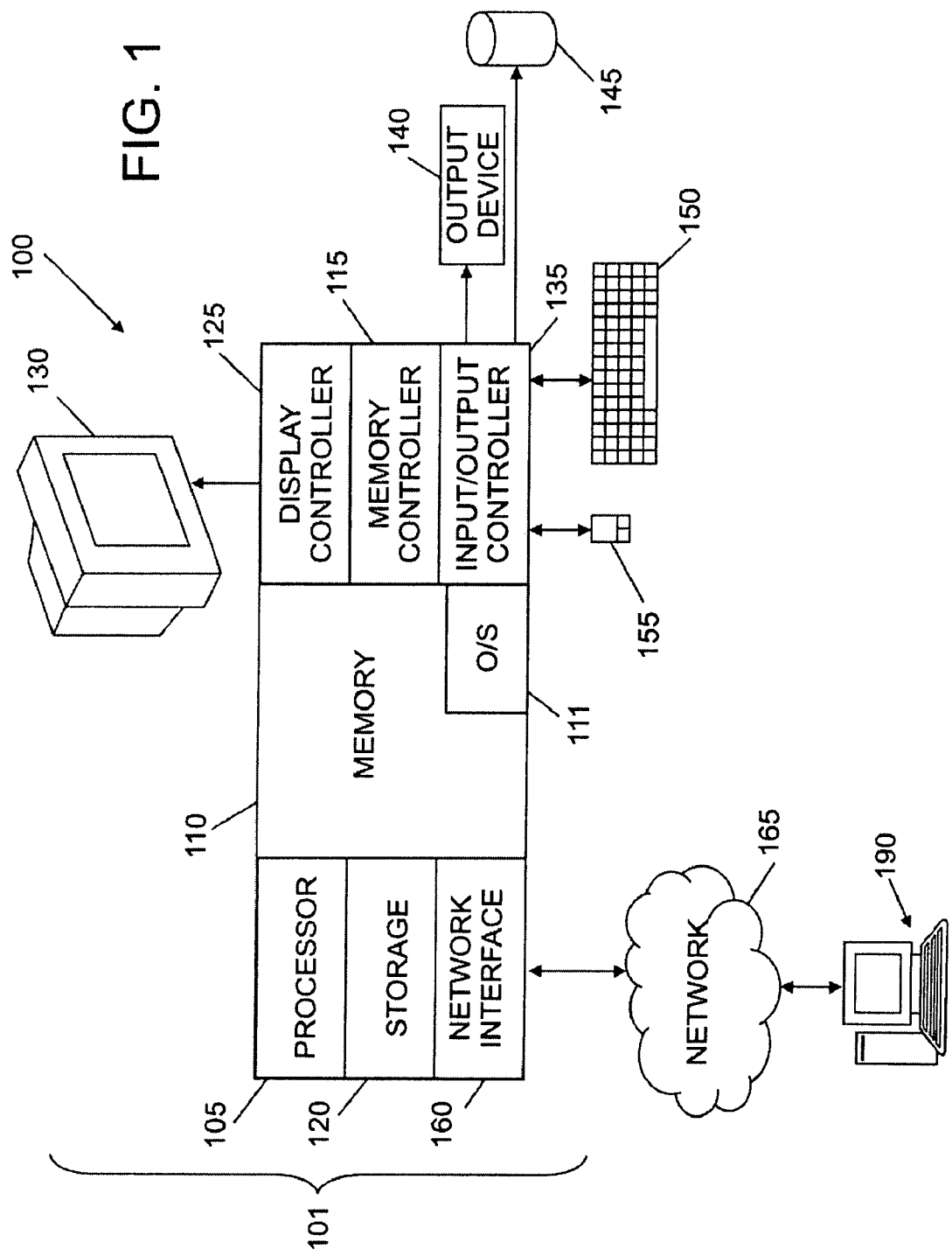

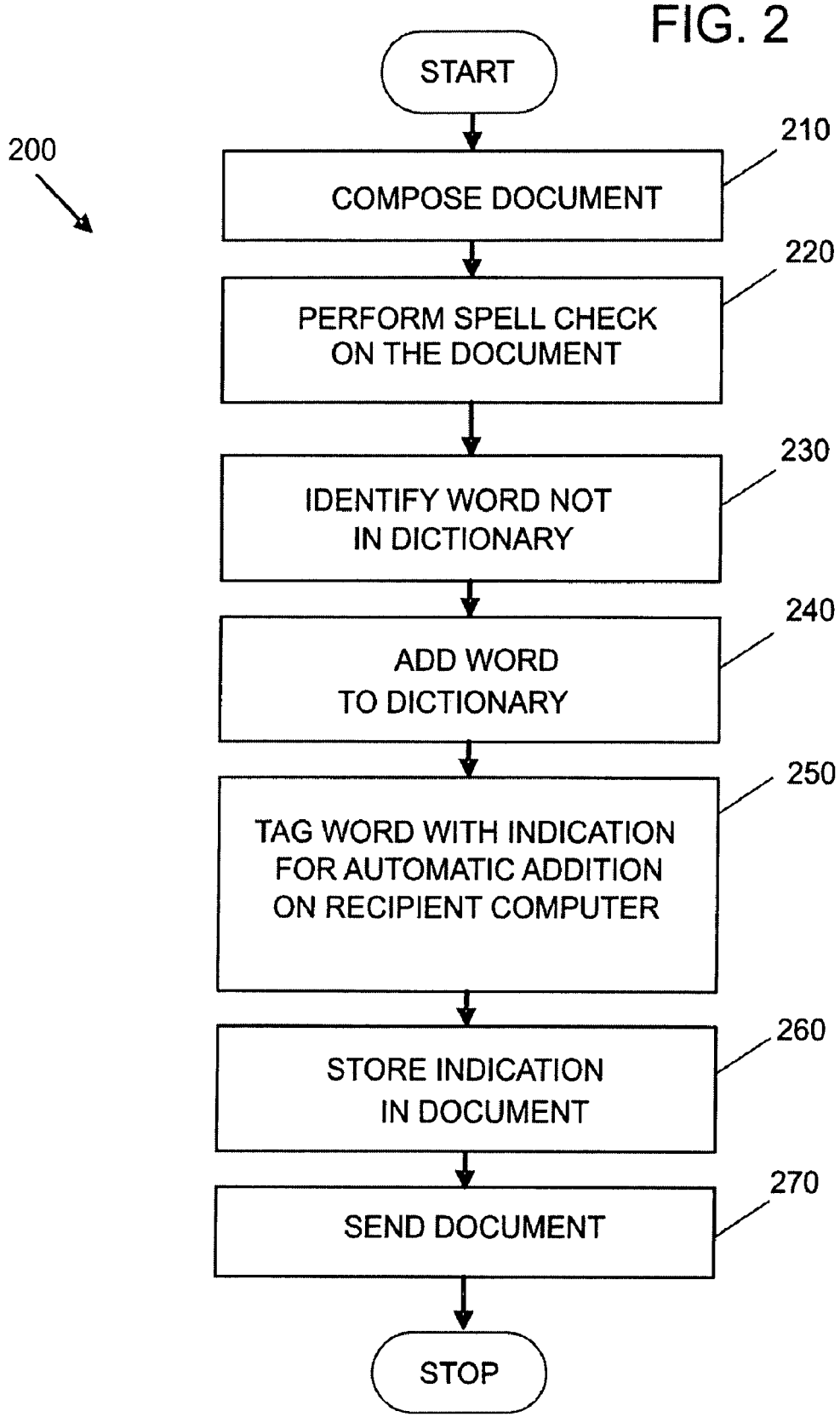

SYSTEMS, METHODS AND COMPUTER PROGRAM PRODUCTS FOR AUTOMATIC DISSEMINATION OF SPELLING RULES WITHIN WORKING GROUPS

TRADEMARKS

IBM ® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to spelling rules, and particularly to systems, methods, and computer program products for automatic dissemination of spelling rules within working groups.

2. Description of Background

Current word processing applications include a spell checker that is adapted to the specific business or application domain. Maintaining and manually updating custom spelling dictionaries is a daunting task, and it becomes difficult for users to add new words to their local dictionaries and eventually stop adding words. Current technology lacks collaborative creation and maintenance of domain linguistic knowledge within groups of users, respecting security and privacy.

SUMMARY OF THE INVENTION

Exemplary embodiments include a method for automatic dissemination of spelling rules within working groups having a sender computer and one or more recipient computers, the method including composing a document on the sender computer, performiing a spell check on text within the document, identifying a word flagged by the spell check as being absent from a dictionary associated with the spell check and with the sender computer, adding the flagged word to the dictionary associated with the sender computer, tagging the flagged word with an indication that the flagged word is to be added to a dictionary associated with the recipient computer in response to the document being received or opened in the recipient computer, storing the indication within the document and sending the document to the recipient computer.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides systems and methods for collaborative creation and maintenance of domain linguistic knowledge within groups of users, respecting security and privacy. A sender computer sends a document having added and tagged particular words to the sender computer dictionary. When the document is received in the recipient computer, the tagged words are automatically added to the recipient computer's dictionary.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an exemplary embodiment of a system for automatic dissemination of spelling rules within working groups; and FIG. 2 illustrates a flowchart of a method for automatic dissemination of spelling rules within working groups in accordance with exemplary embodiments.

The detailed description explains the preferred embodiments of the invention, together with advantages and features, by way of example with reference to the drawings.

DETAILED DESCRIPTION OF THE INVENTION

In exemplary embodiments, the systems and methods described herein are configured to attach spell checker information to a document under composition rather than just the user's computer, thereby automatically adding words to the reader's dictionary. For example, if a user is composing an email and the spell checker flags a word that is a proper name (e.g., a trademark or product name), currently the user clicks on the word to add the word to the dictionary. Currently, this information is stored only on the sender's computer. In exemplary embodiments, the systems and methods described herein attach such information to the document and allow the reader to have this word added automatically to his or her dictionary (and maybe other similar words from the document that are in the special dictionary of the sender; but not the entire contents of the sender's dictionary, as this may potentially violate security and/or privacy). It is appreciated that the embodiments described herein can be applied to other types of information, not only spell checking (e.g., synonyms, external references, semantic disambiguation of acronyms and terms). It is also appreciated that the systems and methods described herein can also be applied to metadata and other forms of document annotations. People exchange documents in the course of their day-to-day activities. The documents can be e-mails, instant messages, or general office documents. The sender's computer has a lot of information about the document that: can be useful for the reader—not in relation to this particular document, but in general. The problem is, though that people do not typically exchange their personal information. In a context of a specific document, though, the right of the reader to know that something is a product name or an acronym meaning something (but not something else) is usually clear.

FIG. 1 illustrates an exemplary embodiment of a system 100 for automatic dissemination of spelling rules within working groups. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the spelling rules methods described herein in accordance with exemplary embodiments and a suitable operating system (OS) 111. The operating system 111 essentially controls the execution of other computer programs, such the spelling rules systems and methods described herein, and provides scheduling, input-output control, file and data management, memory management, and communication control and related services.

The spelling rules methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the spelling rules methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation., the processor 105 is configured to execute software stored within the memory 110, to communicate data to and from the memory 110, and to generally control operations of the computer 101 pursuant to the software. The spelling rules methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The spelling rules methods described herein can be embodied in any computer-readable medium for use by or in connection with an instruction execution system, apparatus, or device, such as a computer-based system, processor-containing system, or other system that can fetch the instructions fromn the instruction execution system, apparatus, or device and execute the instructions In exemplary embodiments, a "computer-readable medium" can be any means that can store, communicate., propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the spelling rules methods are implemented in hardware, the spelling rules methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. in exemplary embodiments, the processes can also inquire or accept a grace period, input by a user of the computer 101. The grace period can be a time period after which all traffic to and from the computer ceases if no further activity has been sensed by the processes. In this way, if a user has left the computer 101 for an extended period of time or has left the computer (e.g., after a work, day) the computer 101 no longer allows traffic to and from the computer 101. In an alternative implementation, the computer 101 can totally power down after the grace period has expired. In further exemplary embodiments, the processes can accept traffic only from a common network maintenance control system that provides limited services. The system 100 further includes a recipient computer 190 similarly configured to the computer 101 described above. As further described herein, spelling rules that occur on either of the computers 101, 190 can be automatically disseminated to the respective other computer 101, 190.

In exemplary embodiments, when composing a document, annotation of this document takes place on the composing party's computer. Such annotation includes manual annotation, when user explicitly tells spell checker that certain word is correctly spelled, or selects some information associated with them or with entire document. The annotation can also be automatic annotation, when words or multi-word, or other sorts of expressions are identified and then either confirmed to be correct, or disambiguated and identified with records on user's computer or external (maybe using previous manual actions of the sender, such as contents of custom spell checking dictionary). This information can be then extracted by the reader's computer and stored or merged with information that existed before (for example, "WAS" is correctly spelled, but it is equivalent to "WebSphere Application Server" as this information has been stored in the document we are reading at the moment).

The systems and methods described herein can be technically implemented for rich text documents and e-mails in standard way, as many rich text formats allow for content tagging. The systems and methods described herein can further be implemented by using extra tags for e-mail formats that allow for them (e.g., Lotus Notes). The systems and methods described herein can further be implemented by using special Unicode markers for text content that is transmitted using Unicode: the terms that were in the sender's user dictionary are preceded and followed by a specially constructed sequence of characters that is unlikely to happen naturally, for example, three zero-width spaces (e.g., code feff).

FIG. 2 illustrates a flowchart of a method 200 for automatic dissemination of spelling rules within working groups in accordance with exemplary embodiments. At block 210, the user composes a document on the computer 101. At block 220, the user performs a spell check on the text of the document. At block 230 the user identifies a word flagged by the spell check as being absent from a dictionary associated with the spell check and with the sender computer 101. At block 240, the user adds the flagged word to the dictionary associated with the sender computer. At block 250, the user tags the flagged word with an indication that the flagged word is to be added to a dictionary associated with the recipient computer 190 in response to the document being received in the recipient computer 190. It is appreciated that the method 200 can automatically tag the word for the user once the user indicates that the word should be added to the dictionaries. At block. 260, the method 200 stores the indication within the document. At block 270, the user sends the document to the recipient computer 190. In exemplary embodiments. the additional words can be sent from the user computer 101 to the recipient computer 190 as discussed above. The additional tagged words are automatically added to the dictionary associated with the recipient computer 190 when the recipient computer 190 receives the document.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which fillow. These claims should be construed to maintain the proper protection for the invention first described.

What is claimed is:

1. A method for automatic dissemination of spelling rules within working groups having a sender computer and a recipient computer, the method consisting of:
  composing a document on the sender computer;
  performing a spell check on text within the document;
  identifying a word flagged by the spell check as being absent from a dictionary associated with the spell check and with the sender computer;
  adding the flagged word to the dictionary associated with the sender computer;
  tagging the flagged word with an indication that the flagged word is to be added to a dictionary associated with the recipient computer in response to the document being at least one of received and opened in the recipient computer, wherein the tagging of the flagged words defines a spelling rule;

storing the indication within the document;

sending the document to the recipient computer;

at least one of receiving and opening the document on the recipient computer;

adding the tagged words to the dictionary associated with the recipient computer and in accordance with preferences of the recipient computer, wherein adding the tagged words operates to disseminate the spelling rule; and sending additional tagged words from the dictionary associated with the sender computer, the additional tagged words being absent from the document, wherein the additional tagged words are automatically added to the dictionary associated with the recipient computer in response to the recipient computer receiving the document wherein adding the additional tagged words operates to disseminate spelling rules associated with the additional tagged words.

* * * * *